US012138564B2

(12) United States Patent
Nölker

(10) Patent No.: US 12,138,564 B2
(45) Date of Patent: Nov. 12, 2024

(54) METHOD FOR REMOVING INERT GAS FROM LIQUID AMMONIA

(71) Applicants: thyssenkrupp Industrial Solutions AG, Essen (DE); thyssenkrupp AG, Essen (DE)

(72) Inventor: Klaus Nölker, Dortmund (DE)

(73) Assignees: thyssenkrupp Uhde GmbH, Dortmund (DE); thyssenkrupp AG, Essen (DE)

(*) Notice: Subject to any disclaimer, the term of this patent is extended or adjusted under 35 U.S.C. 154(b) by 785 days.

(21) Appl. No.: 17/277,499

(22) PCT Filed: Sep. 13, 2019

(86) PCT No.: PCT/EP2019/074484
§ 371 (c)(1),
(2) Date: Mar. 18, 2021

(87) PCT Pub. No.: WO2020/058117
PCT Pub. Date: Mar. 26, 2020

(65) Prior Publication Data
US 2022/0023775 A1 Jan. 27, 2022

(30) Foreign Application Priority Data
Sep. 19, 2018 (DE) .................... 10 2018 215 884.3

(51) Int. Cl.
B01D 19/00 (2006.01)
B01D 1/28 (2006.01)
(Continued)

(52) U.S. Cl.
CPC ....... B01D 19/0073 (2013.01); B01D 1/2887 (2013.01); B01D 5/006 (2013.01);
(Continued)

(58) Field of Classification Search
CPC .... B01D 1/2887; B01D 5/006; B01D 5/0069; B01D 5/0093; B01D 19/0036; B01D 19/0073; C01C 1/024; Y02P 20/50
See application file for complete search history.

(56) References Cited

U.S. PATENT DOCUMENTS 2,050,511 A    8/1936  Twomey
3,607,048 A *  9/1971  Karwat .................. C01B 3/025
                                              422/140
(Continued)

FOREIGN PATENT DOCUMENTS

CN    102 923 733 B    7/2014
DE     40 10 604 A    10/1990
(Continued)

OTHER PUBLICATIONS

English Translation of International Search Report issued in PCT/EP2019/074484, dated Nov. 15, 2019.

Primary Examiner — Christopher P Jones
Assistant Examiner — Phillip Y Shao
(74) Attorney, Agent, or Firm — thyssenkrupp North America, LLC

(57) ABSTRACT

A method of removing inert gas dissolved in liquid ammonia involves evaporating, compressing, and then condensing the liquid ammonia together with the inert gas dissolved therein. Thereby, a product stream of warm liquid ammonia that has been freed of the inert gas is obtained, which is under elevated pressure relative to standard pressure and hence suitable for immediate use in methods in which pure liquid pressurized ammonia is required. If, by contrast, the ammonia is cooled first, for example, below the boiling temperature for ammonia and expanded to standard pressure to store it in tanks as liquid ammonia at low temperatures, it is necessary first to reheat and compress it for further process- (Continued)

ing operations. Thus the disclosed methods lead to significant energy savings.

14 Claims, 1 Drawing Sheet

(51) Int. Cl.
*B01D 5/00* (2006.01)
*C01C 1/02* (2006.01)

(52) U.S. Cl.
CPC ......... *B01D 5/0069* (2013.01); *B01D 5/0093* (2013.01); *B01D 19/0036* (2013.01); *C01C 1/024* (2013.01)

(56) References Cited

U.S. PATENT DOCUMENTS

| | | | | |
|---|---|---|---|---|
| 4,311,856 A | * | 1/1982 | Inoue | C07C 273/04 95/158 |
| 4,568,531 A | * | 2/1986 | van Dijk | B01J 8/0488 423/361 |
| 4,594,233 A | * | 6/1986 | Parrish | C01C 1/0488 425/360 |
| 4,699,772 A | * | 10/1987 | de Lathouder | C01B 3/025 252/376 |
| 5,069,891 A | * | 12/1991 | Bendix | C01B 3/025 423/359 |
| 7,070,750 B2 | * | 7/2006 | Lippmann | C01C 1/0411 423/362 |
| 8,247,463 B2 | * | 8/2012 | Yoshida | C01B 3/382 518/703 |
| 2002/0034467 A1 | * | 3/2002 | Otsuka | C23C 16/4402 423/247 |
| 2004/0091413 A1 | * | 5/2004 | Otsuka | B01J 20/0222 423/352 |
| 2014/0223951 A1 | * | 8/2014 | Arora | C01C 1/003 165/63 |

FOREIGN PATENT DOCUMENTS

| | | |
|---|---|---|
| DE | 100 55 818 A | 5/2002 |
| DE | 100 57 863 A | 5/2002 |
| JP | 2013 163 599 A | 8/2013 |
| TW | 201 238 896 A | 10/2012 |
| WO | 03/008333 A | 1/2003 |

* cited by examiner

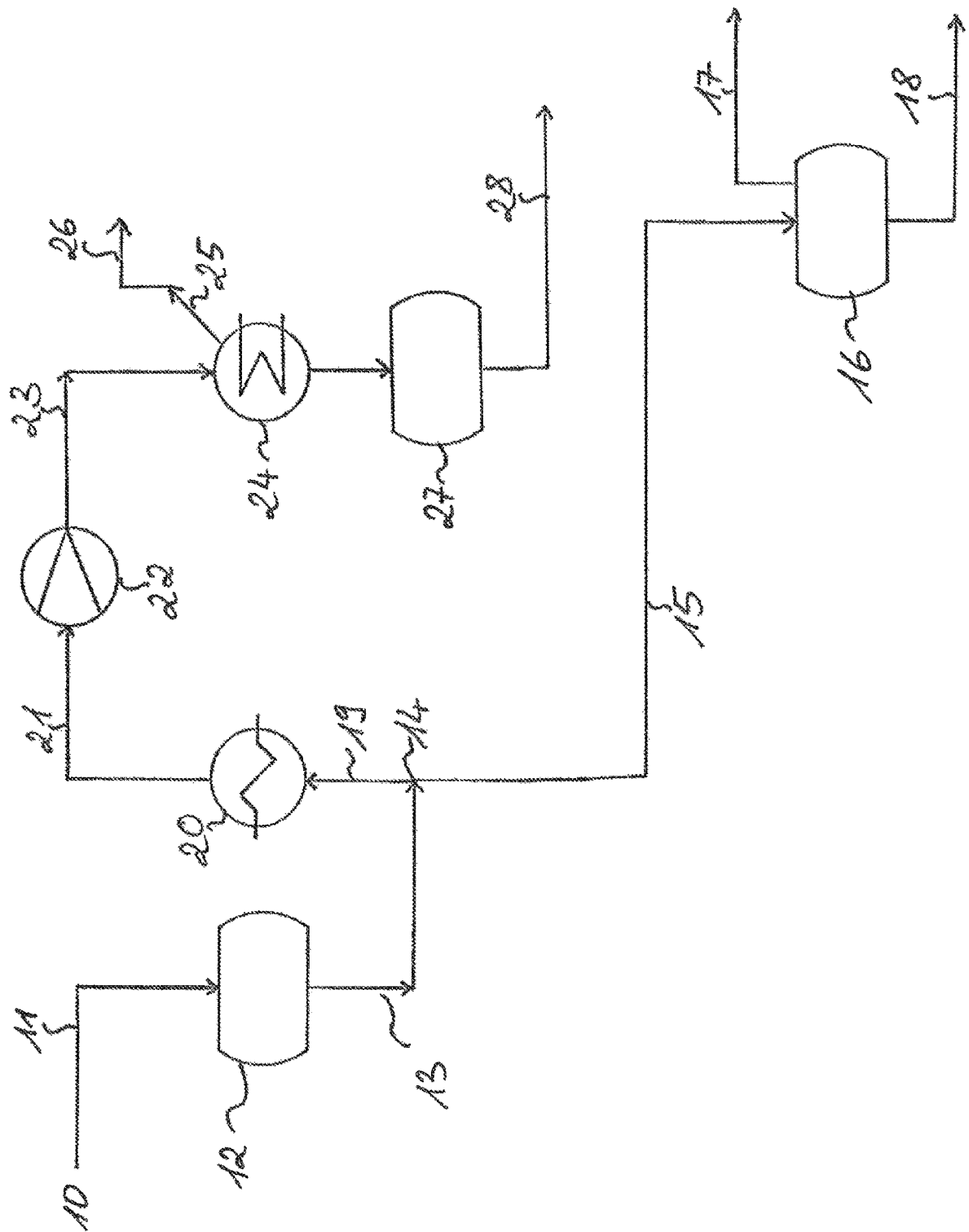

METHOD FOR REMOVING INERT GAS FROM LIQUID AMMONIA

CROSS REFERENCE TO RELATED APPLICATIONS

This application is a U.S. National Stage Entry of International Patent Application Serial Number PCT/EP2019/074484, filed Sep. 13, 2019, which claims priority to German Patent Application No. DE 10 2018 215 884.3, filed Sep. 19, 2018, the entire contents of both of which are incorporated herein by reference.

FIELD

The present disclosure generally relates to methods of removing gases such as inert gases dissolved in liquid ammonia.

BACKGROUND

In the preparation of ammonia, the synthesis gas, as well as hydrogen and nitrogen, typically additionally comprises inert gases such as methane and noble gases that impair the yield of ammonia. In these methods, fresh synthesis gas is typically first compressed to high pressure in multiple stages. Then the compressed fresh synthesis gas is fed into a circuit that runs through one or more catalyst-filled reactors in which ammonia is generated. A separation system is included in the circuit, which is used to remove the ammonia generated from the circuit in liquid form.

The inert gases are soluble in ammonia only in low concentration and are therefore removed together with the ammonia only to a small degree. In order to avoid enrichment of the inert gases in the circuit, in these conventional methods, a portion of the gas circulated is constantly discharged as purge gas. Residues of ammonia are then scrubbed out of this discharged purge gas. Hydrogen and also any nitrogen are separated out and recovered, for example by means of membranes or by fractionation at low temperatures. The inert gases remaining, especially methane, argon and helium, are discarded or utilized in some other way, especially for heating purposes. The hydrogen recovered and also any nitrogen recovered are added to the fresh synthesis gas upstream of the compression and utilized in that way.

DE 100 57 863 A1 discloses a method of preparing ammonia from fresh synthesis gas comprising inert constituents as well as hydrogen and nitrogen in at least two reaction systems, wherein ammonia is synthesized from synthesis gas successively in various synthesis systems. At the same time, inert gas constituents are removed and discharged via a purge gas stream. Inert gases or "inerts" in the preparation of ammonia refer to those components that are inert in the conversion of hydrogen and nitrogen to ammonia. Examples of these inert gases include the noble gases and methane. Where the term "inert gases" is used in the present application, this is to be understood within the meaning of the above definition.

However, it is energetically unfavorable to discharge purge gas from the circuit, since large amounts of gas undergo a pressure drop in the separation and then have to be recompressed again in a costly and inconvenient manner. For that reason, enrichment of the inert gases from originally 1% to 2% by volume in the fresh synthesis gas up to 10% to 20% by volume within the circulated gas frequently has to be accepted, even though this is inevitably associated with the drawback that the partial pressures of hydrogen and nitrogen will be considerably lower than in a synthesis circuit containing a lower level of inert gases, if any. For that reason, the catalyst volumes and the reactors containing them also have to be on a distantly larger scale than would be required without inert gases in the synthesis circuit.

In the ammonia synthesis, the synthesis gas in the reactor affords a gas mixture comprising, as well as the unconverted hydrogen and nitrogen, the ammonia formed and the inert gases. At the reactor outlet, the ammonia generated is in gaseous form. In order to separate the ammonia from the reactant gas, it is condensed, in order that it can be drawn off from the circuit in liquid form. Since the dew point of ammonia depends on its partial pressure, the condensation of ammonia is promoted by a high synthesis pressure, a high ammonia concentration and a low temperature. A high ammonia concentration can be achieved with large catalyst volumes and low concentrations of inert gas. A high synthesis pressure means corresponding energy expenditure for the synthesis gas compression, and a lower cooling temperature requires the appropriate cooling apparatus for the circulated gas.

It is known from document DE 100 57 863 A1 that the preparation of ammonia can optionally be undertaken in multiple reaction systems connected in series. In this case too, the ammonia is condensed out and discharged from the synthesis circuit as liquid ammonia each time.

A further process for preparing ammonia from a nitrogen-hydrogen mixture that has been obtained from natural gas is known from DE 100 55 818 A1. The crude product gas mixture is subjected here to multistage cooling and then arrives at a separator from which crude ammonia is drawn off in liquid form. The gaseous components separated off here are generally returned to the reaction system as cycle gas. This document also discloses supplying the crude ammonia subsequently to a urea synthesis.

However, the liquid ammonia generated by the conventional methods in the ammonia synthesis generally still contains dissolved gases that are disruptive in any subsequent urea synthesis, for example, since there can be formation of explosive off gases in the urea plant. In order to avoid this, it is advantageous when a minimum amount of gases is dissolved in the liquid ammonia supplied as feedstock in the urea synthesis.

Thus, a need exists for an effective method of removing dissolved gases from the liquid ammonia obtained in ammonia synthesis.

BRIEF DESCRIPTION OF THE FIGURE

The Figure is a schematically simplified flow diagram of an example plant.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

What is envisaged in accordance with the invention is that the liquid ammonia together with the gases, preferably inert gases, dissolved therein is first evaporated in at least one first method step, then compressed in at least one second method step, and subsequently condensed again in at least one third method step.

The gases dissolved in the liquid ammonia which is supplied to the system are primarily inert gases as defined above, i.e. gases that are neutral in the synthesis of ammonia, such as, in particular, the noble gases helium and argon, and methane. However, it is also possible for small amounts of hydrogen and nitrogen, the reactant gases in the ammonia synthesis, to be dissolved in the ammonia after the synthesis, for example. These gases are not covered by the term "inert gases", but are likewise removed from the liquid ammonia in the procedure of the invention. The inert gases, and also hydrogen and nitrogen, are generally dissolved in the liquid ammonia in amounts that are, for example, in the region of not more than about one hundred ppm.

A particular advantage of the method of the invention is that a product stream of "warm" liquid ammonia that has been freed of the inert gases and further gases is obtained, which is under elevated pressure relative to standard pressure and hence is suitable for immediate use in methods in which pure liquid pressurized ammonia is required, for example for the urea synthesis or the like. If, by contrast, the ammonia were first to be cooled, for example below the boiling temperature, which is −33° C. for ammonia, and expanded to standard pressure, in order then to store it in tanks as liquid ammonia at low temperatures, it would be necessary first to reheat and compress it for further processing operations of the aforementioned type. For this purpose, it would be necessary to expend energy, and so the method of the invention leads to a significant energy saving. Moreover, the process of the invention affords the ammonia in a greater purity than usual in the ammonia synthesis, such that there is no need for further purification steps for removal of troublesome residual amounts of gases dissolved in the liquid ammonia in the case of direct processing of the ammonia from the ammonia synthesis.

In a preferred development of the invention, the condensation of the ammonia in the third method step is effected at an elevated pressure and at a temperature above +10° C., preferably at a temperature in the range from +10° C. to +30° C. When a product stream of "warm" liquid ammonia is discussed here, what this means is that it is liquid ammonia at a temperature above the boiling temperature of ammonia under standard pressure (which is −33° C.), meaning that the liquid ammonia is, for example, at about room temperature and consequently under elevated pressure. The exact temperature of the warm liquid ammonia that has been freed of dissolved gases depends on the temperature of the cooling water by means of which the ammonia is condensed in the third method step.

"Cold" liquid ammonia, by contrast, is understood to mean liquid ammonia which is either below the boiling temperature of −33° C. and hence in liquid form at standard pressure or is in liquid form at somewhat higher temperatures of, for example, between −33° C. and +10° C. and correspondingly elevated pressure. This "cold" liquid ammonia in the context of the present invention is thus at a lower temperature than the abovementioned "warm" liquid ammonia.

In a preferred development of the invention, the heat absorbed by the ammonia in them method step of evaporation is used for cooling of a process stream. The method step of evaporation in which heat is taken from the environment can thus be utilized, for example, in order to cool process streams outside the system, for which it is consequently not necessary to provide any separate coolant.

In a preferred development of the invention, for example, the heat absorbed by the ammonia in the method step of evaporation is used for condensation of ammonia in an ammonia synthesis plant. In this variant, what is enabled by the inventive process step of evaporation is coupling with the step of condensation of ammonia in an ammonia synthesis plant. The two method steps can be linked to one another in an energetically favorable manner.

In a preferred development of the present invention, the ammonia is condensed in the third method step at an elevated pressure in the range from, for example, about 10 bar to about 30 bar, preferably in the range from about 15 bar to about 25 bar. The pressure required here, as mentioned above, depends on the respective temperature at which the ammonia is condensed.

In a preferred development of the invention, the evaporated ammonia, after being evaporated, is compressed together with the gases previously dissolved in the ammonia. This means that the dissolved gases are removed only thereafter in the ammonia condenser.

In a preferred development of the invention, the compressed ammonia, after being compressed, is condensed with the aid of cooling water. The condensation temperature consequently depends on the temperature of the cooling water used.

In a preferred development of the invention, the gases that are insoluble in ammonia on condensation of the ammonia are drawn off from the apparatus used for condensation. In the condensation, the temperature and pressure are preferably chosen such that the ammonia just condenses. The solubility of the gases in the liquid ammonia is at its lowest at or close to the boiling temperature, such that the gases are then no longer dissolved in the ammonia and, consequently, are present as gases separately from the liquid ammonia and can be drawn off.

In one possible development of the invention, the gases drawn off in the method described above may be recycled. This is advisable, for example, when these gases still contain proportions of the hydrogen and/or nitrogen reactant gases, which are then recycled into the plant for preparation of ammonia, where they can be used for preparation of further ammonia.

In a preferred development of the invention, only a first substream of a reactant stream of liquid ammonia is evaporated, then compressed, subsequently condensed and removed from the system as ammonia that has been freed of the gases, especially inert gases, in a liquid pressurized warm stream, while a second substream is branched off from the reactant stream and branched off from the system as a cold liquid stream without further workup at first. With regard to the terms "warm" stream and "cold" stream used here, reference is made to the definitions given above. The "warm" substream is generally sent to a plant in which further processing of the ammonia is envisaged, for example a urea synthesis plant. This has the advantage that the purified ammonia at an elevated temperature and correspondingly elevated pressure can be processed further directly therein, such that there is no need for heating and compression of the ammonia. There is thus also avoidance here of an energy loss that would occur if the ammonia were first to be cooled below its boiling point (−33° C.) and intermediately stored in cooled form at standard pressure.

The second substream which is branched off from the reactant stream can, by contrast, firstly be intermediately stored as a cold stream of liquid ammonia and therefore need not pass through the purification steps of evaporating, compressing and condensation that are envisaged in accordance with the invention. This second substream can, for example, be intermediately stored cold in a tank. For this purpose, this substream is expanded and cooled down below the condensation temperature of ammonia of −33° C. This expansion causes the gases dissolved in the ammonia to outgas, such that the purifying process of the invention for removal of gases dissolved in the ammonia is not required for this substream. In other words, a portion of the ammonia for which it is known from the outset that there will be no further processing while warm and under elevated pressure, but that cold intermediate storage is envisaged for this portion, can be branched off as a cold substream.

In a preferred development of the invention, the first warm substream of the ammonia which is condensed and freed of the inert gases constitutes a main stream of the ammonia removed from the system. According to the use intended for the ammonia and how the method of the invention is connected to downstream methods for further processing of the ammonia, the warm substream that constitutes the main stream may account, for example, for 70% to 100%, preferably up to about 90%, of the ammonia processed in the system, such that the substream which is not subjected to further processing and is removed as a cold substream accounts, for example, for a small substream of 0% to 30%, preferably of at least about 10%, of the reactant stream supplied to the plant overall.

The present invention further provides a plant for removal of inert gases dissolved in liquid ammonia, comprising at least one conduit for the supply of liquid ammonia to at least one ammonia evaporator, at least one ammonia compressor functionally connected to said ammonia evaporator, at least one ammonia condenser functionally connected to said ammonia compressor and having means of removing a stream of inert gases separated off in said ammonia condenser, and at least one collecting vessel which is functionally connected to said ammonia condenser and is for accommodating liquid ammonia that has been freed of inert gases.

In a further preferred development of the plant of the invention, the conduit for the supply of liquid ammonia is connected to an output conduit of a plant for preparation of ammonia or is such an output conduit. In this preferred variant, ammonia can thus be freed of the gases dissolved in the ammonia and hence purified further directly from the preparation without intermediate cooling and under the pressure and at the temperature at which it is obtained in the preparation process.

In a further preferred development of the invention, the plant comprises a vessel for the accommodation of ammonia contaminated with inert gases, from which a first conduit leads to the ammonia evaporator, wherein at least one branch conduit that branches off from said first conduit is used to remove a substream of liquid ammonia from the plant. In this way, it is possible to free the ammonia only partly, generally predominantly, of the gases dissolved in the ammonia in the plant of the invention and to remove it as a warm purified substream, while a smaller substream is passed onward via the branch conduit as a cold stream of liquid ammonia without the purifying process, in order then to store it, generally in cold form.

A possible working example of the present invention is elucidated in detail hereinafter with reference to FIG. 1. The diagram shows a simplified flow diagram of an illustrative plant of the invention for removal of gases dissolved in liquid ammonia from the ammonia. The diagram is highly schematically simplified, and only the plant components that are essential in the context of the present invention are shown.

A process stream 10 of liquid ammonia which comprises dissolved gases such as inert gases and possibly further gases and which comes from a plant for preparation of ammonia (this ammonia plant is not shown here) is fed via the conduit 11 to a vessel 12 in which liquid ammonia can optionally be stored intermediately before the processing of the invention. Liquid ammonia is removed from this vessel 12 via the conduit 13, and this conduit divides downstream of a branch 14, giving rise to two substreams of liquid ammonia. A first, smaller substream flows through conduit 15 and is supplied as a cold substream of liquid ammonia to a further tank 16. The ammonia can be expanded to standard pressure therein, in which case gases dissolved in the ammonia outgas and can be removed via conduit 17. The cold liquid ammonia can be removed via conduit 18 and, for example, exported or, after heating and compression, fed to a urea plant via conduit 17.

Proceeding from the branch 14, by contrast, the predominant substream is processed by the method of the invention, for which purpose it is fed via conduit 19 to an ammonia evaporator 20. After being evaporated, the process stream is fed via conduit 21 to an ammonia compressor 22. After the compression, the process stream passes through conduit 23 to an ammonia condenser 24. The compressed ammonia can be condensed therein with the aid of cooling water. The temperature of the ammonia after the condensation is, for example, about 30° C., and the condensed liquid ammonia is accordingly under elevated pressure. This condensation causes the gases to be separated from the ammonia to escape, and they can therefore be drawn off from the condenser in gaseous form via conduit 25 and removed from the plant via the output conduit 26.

The purified liquid ammonia can optionally be stored intermediately under pressure at the appropriate temperature in a tank 27. From this tank, it is then possible to feed a warm stream of liquid pressurized ammonia via conduit 28 to a further plant, for example a urea plant. It is also possible to dispense with the intermediate storage in the tank 27 when, for example, there is an immediate need for an appropriate amount of "warm" liquid ammonia for a further process in which the ammonia is required as a warm pressurized stream and hence can be processed further directly without intermediate cooling.

The advantage of the method of the invention is thus that it can be used to produce a purified "warm" substream of liquid ammonia on the one hand and optionally also a "cold" substream of liquid ammonia that does not require any separate processing.

LIST OF REFERENCE NUMERALS 10 process stream
11 conduit
12 vessel
13 conduit
14 branch
15 conduit 16 tank
17 conduit
18 conduit
19 conduit/first substream
20 ammonia evaporator
21 conduit
22 ammonia compressor
23 conduit
24 ammonia condenser
25 conduit
26 output conduit
27 tank
28 conduit

What is claimed is:

1. A method of removing inert gas dissolved in liquid ammonia, the method comprising delivering the liquid ammonia through a first conduit that branches into a first substream and a second substream, wherein the first substream sequentially undergoes evaporating at an evaporator, compressing at a compressor, and then condensing at a condenser causing the inert gas dissolved therein to escape from the liquid ammonia in the first substream at the condenser, wherein the second substream is expanded to a pressure in which gasses dissolved in the second substream are outgassed.

2. The method of claim 1 wherein the inert gas consists of a noble gas.

3. The method of claim 1 wherein the inert gas consists of at least one of helium, argon, or methane.

4. The method of claim 1 wherein the liquid ammonia enters the compressor at a first pressure and is compressed by the compressor to a second pressure, the second pressure being higher than the first pressure, the second pressure and at a temperature above +10° C.

5. The method of claim 1 wherein the liquid ammonia enters the compressor at a first pressure and is compressed by the compressor to a second pressure, the second pressure being higher than the first pressure, the second pressure in a range from 10 bar to 30 bar.

6. The method of claim 1 comprising cooling a process stream with heat that is absorbed by the ammonia during the evaporation.

7. The method of claim 6 comprising using the heat that is absorbed by the ammonia during the evaporation for condensation of ammonia in an ammonia synthesis plant.

8. The method of claim 1 wherein evaporated ammonia is compressed together with the inert gas dissolved in the ammonia.

9. The method of claim 1 wherein compressed ammonia is condensed with the aid of cooling water.

10. The method of claim 1 comprising drawing off gases that are insoluble in ammonia during the condensation from an apparatus used for the condensation.

11. The method of claim 10 comprising recycling the drawn off gases into a plant for preparing ammonia.

12. The method of claim 1 wherein the first substream of the liquid ammonia that has been evaporated, compressed, condensed, and then removed from a system as ammonia that has been freed of the inert gas is in a liquid pressurized warm stream, the second substream from the reactant stream branching off as a cold liquid stream.

13. The method of claim 12 wherein the first substream is a main stream of the ammonia removed from the system.

14. The method of claim 12 comprising:
feeding the second substream to a tank and expanding the second substream to a pressure in which gases dissolved in ammonia outgas in the tank; and
drawing off the inert gas from the tank while expanding the second substream.

\* \* \* \* \*